United States Patent [19]
Koketsu et al.

[11] Patent Number: 6,156,378
[45] Date of Patent: Dec. 5, 2000

[54] PROCESS FOR PRODUCING PRESSURE-SENSITIVE ADHESIVE SHEET

[75] Inventors: Akemi Koketsu; Minoru Tanaka; Hiroshi Iesako, all of Aichi, Japan

[73] Assignee: Toagosei Co., Ltd., Tokyo, Japan

[21] Appl. No.: 09/366,647

[22] Filed: Aug. 4, 1999

[30]     Foreign Application Priority Data

Aug. 19, 1998  [JP]  Japan ................................. 10-276438

[51] Int. Cl.⁷ ...................................................... B05D 5/10
[52] U.S. Cl. .................................... 427/208.4; 427/389.7; 427/393.5
[58] Field of Search ........................... 427/208.4, 389.7, 427/393.5

[56]           References Cited

U.S. PATENT DOCUMENTS 4,419,481  12/1983  Schwartz .................................. 524/551

FOREIGN PATENT DOCUMENTS

| 0 822 206 A1 | 2/1998 | European Pat. Off. . |
| 59-098177 | 6/1984 | Japan . |
| 63-097672 | 4/1988 | Japan . |
| 3-124786 | 5/1991 | Japan . |

OTHER PUBLICATIONS

XP–002120553—6001 Chemical Abstracts 112 (1990).
European Search Report, Oct. 1999, FOR EP978551.

*Primary Examiner*—Erma Cameron
*Attorney, Agent, or Firm*—Sughrue, Mion, Zinn, Macpeak & Seas, PLLC

[57]         ABSTRACT

A process for producing a pressure-sensitive adhesive sheet using an aqueous resin emulsion is disclosed. The aqueous resin emulsion is an aqueous resin emulsion that dispersed particles have a weight average particle diameter of 0.3 $\mu$m or smaller and a ratio of the weight average particle diameter thereof to an arithmetic average particle diameter thereof [(weight average particle diameter)/(arithmetic average particle diameter)] is 1.0 to 1.5. The resin contained in the aqueous resin emulsion preferably comprises an alkyl (meth)acrylate monomer unit (a) having 4 to 12 carbon atoms in the alkyl moiety, an $\alpha,\beta$-ethylenically unsaturated carboxylic acid monomer unit (b), and a radically polymerizable monomer unit (c) having a cyclic structure, other than the monomer units (a) and (b), the proportions of the monomer unit (a), the monomer unit (b), and the monomer unit (c) being 45 to 97% by weight, 0.1 to 10% by weight, and 2.9 to 30% by weight, respectively, with the total amount of those units being 100% by weight. The aqueous resin emulsion preferably contains a nonionic surfactant. The pressure-sensitive adhesive sheet obtained by the process has a property such that the pressure-sensitive adhesive layer thereof is less apt to blush even upon contact with water by immersion in water, moisture absorption, etc.

17 Claims, No Drawings

PROCESS FOR PRODUCING PRESSURE-SENSITIVE ADHESIVE SHEET

FIELD OF THE INVENTION

The present invention relates to a process for producing a pressure-sensitive adhesive sheet having a pressure-sensitive adhesive layer formed from an aqueous emulsion type pressure-sensitive adhesive or pressure-sensitive adhesive composition. The pressure-sensitive adhesive sheet obtained by the process of the present invention has a property such that the pressure-sensitive adhesive layer thereof is less apt to blush even upon contact with water by immersion in water, moisture absorption, etc.

BACKGROUND OF THE INVENTION

Aqueous emulsion type pressure-sensitive adhesives are extensively used in recent years in place of organic solvent-based pressure-sensitive adhesives from the standpoints of the hygiene of working atmosphere, etc.

However, the aqueous emulsion type pressure-sensitive adhesives generally are inferior in water resistance to solvent-based pressure-sensitive adhesives and have had a problem that the pressure-sensitive adhesive layer formed therefrom is apt to blush due to moisture absorption when exposed to water or moisture. Elimination of this problem of blushing has been desired especially in applications where a pressure-sensitive adhesive sheet using a transparent substrate is used or where transparent materials are bonded to each other with a pressure-sensitive adhesive.

Known techniques for inhibiting the blushing of an aqueous emulsion type pressure-sensitive adhesive include a method in which an aqueous emulsion wherein the dispersed particles have a reduced diameter is used, a method in which a pressure-sensitive adhesive having a heightened crosslink density is used, and a method in which the use amount of a hydrophilic compound such as a surfactant is reduced. For example, such pressure-sensitive adhesives which have been proposed include: a pressure-sensitive adhesive composition comprising a colloidal acrylic emulsion having a particle diameter of from 0.001 to 0.009 µm and a crosslinking agent (see JP-A-62-297372; the term "JP-A" as used herein means an "unexamined published Japanese patent application"); a pressure-sensitive adhesive composition comprising as an essential component an aqueous emulsion having an average particle diameter of 100 nm (0.1 µm) or smaller and a crosslinked structure (see JP-A-1-170677); and a pressure-sensitive adhesive composition containing an acrylic copolymer having an average particle diameter of 0.3 µm or smaller and a gel content of 40% by weight or higher (JP-A-7-26229).

However, the techniques disclosed in the above publication references are not fully effective in inhibiting the blushing of the aqueous emulsion type pressure-sensitive adhesives. A further improvement is still desired.

SUMMARY OF THE INVENTION

The present inventors have found that a pressure-sensitive adhesive sheet obtained using an aqueous resin emulsion in which the dispersed particles have an average particle diameter of 0.3 µm or smaller and a particle diameter distribution within a specific range is less apt to suffer blushing of the pressure-sensitive adhesive layer upon contact with water. The present invention has been completed based on this finding.

The present invention provides a process for producing a pressure-sensitive adhesive sheet, comprising applying an aqueous resin emulsion on a substrate sheet and drying the coating, wherein the aqueous resin emulsion is an aqueous resin emulsion that dispersed particles have a weight average particle diameter of 0.3 µm or smaller and a ratio of the weight average particle diameter thereof to an arithmetic average particle diameter thereof [(weight average particle diameter)/(arithmetic average particle diameter)] is 1.0 to 1.5.

In a preferred embodiment of the above process for producing a pressure-sensitive adhesive sheet, the resin contained in the aqueous resin emulsion comprises an alkyl (meth)acrylate monomer unit (a) having 4 to 12 carbon atoms in the alkyl moiety, an α,β-ethylenically unsaturated carboxylic acid monomer unit (b), and a radically polymerizable monomer unit (c) having a cyclic structure, other than the monomer units (a) and (b), the proportions of the monomer unit (a), the monomer unit (b), and the monomer unit (c) being 45 to 97% by weight, 0.1 to 10% by weight, and 2.9 to 30% by weight, respectively, with the total amount of those units being 100% by weight.

The aqueous resin emulsion used in the present invention preferably contains a nonionic surfactant.

DETAILED DESCRIPTION OF THE INVENTION (1) Average Particle Diameter and Particle Diameter Distribution In the present invention, weight average particle diameter means ($\Sigma nd^4/\Sigma nd^3$), and arithmetic average particle diameter means ($\Sigma nd/\Sigma n$) [provided that n represents the number of particles and d represents particle diameter]. The ratio of the weight average particle diameter to the arithmetic average particle diameter (weight average particle diameter/arithmetic average particle diameter) is hereinafter referred to as "particle diameter distribution". The technical terms "weight average particle diameter" and "arithmetic average particle diameter" are described in, e.g., "Encyclopaedia Chimica", published by Kyoritsu Shuppan K.K (Japan).

The average particle diameter and particle diameter distribution described above can be determined with, for example, laser diffraction/scattering type particle size distribution analyzer LA-910, manufactured by Horiba Ltd., or ELS-800, manufactured by Otsuka Denshi Co., Ltd.

The present invention has been achieved based on the finding that a resin emulsion comprising dispersed resin particles having specific particle diameter and particle diameter distribution described hereinbelow gives a pressure-sensitive adhesive sheet having excellent resistance to blushing (hereinafter referred to as a "blushing resistance"). This effect has not conventionally been known. Although the relationship between the diameter of dispersed particles and blushing resistance is disclosed in the publications described above, there is no description therein concerning the particle diameter distribution.

In the aqueous resin emulsion (hereinafter sometimes referred to as an "emulsion" for simplicity) used in the present invention, the dispersed particles have a weight average particle diameter of 0.3 µm smaller and a particle diameter distribution of 1.0 to 1.5. The weight average particle diameter of the dispersed particles is preferably 0.01 to 0.28 µm, and more preferably 0.05 to 0.26 µm. This is because an emulsion in which the weight-average particle diameter of the dispersed particles is 0.28 µm or smaller gives a pressure-sensitive adhesive sheet having exceedingly high resistance to blushing (hereinafter often referred to as a "blushing resistance"). On the other hand, if the weight-average particle diameter is too small, it is difficult to produce an emulsion having high solid content, resulting in an increased transportation cost, etc., which is poor in practical use.

The particle diameter distribution of the dispersed particles is preferably 1.0 to 1.4, and more preferably 1.0 to 1.3. If the particle diameter distribution thereof exceeds 1.4, blushing resistance tends to be insufficient.

When an emulsion having a particle diameter and a particle diameter distribution both within the respective ranges specified above is mixed with an emulsion outside the scope of the present invention and this mixture is used as a pressure-sensitive adhesive, then the same effect as in the present invention is produced if the proportion of the emulsion according to the present invention is 90% by weight or higher. Consequently, use of an emulsion obtained by mixing an emulsion outside the scope of the present invention with an emulsion according to the present invention in an amount of up to about 10% by weight is included in the present invention.

(2) Dispersed Resin of Emulsion

The dispersed resin contained in the emulsion used in the present invention is not particularly limited. Examples thereof include polymers comprising alkyl (meth)acrylate monomer units as main constituent units (hereinafter referred to as "acrylic polymers"), polymers comprising ethylene monomer units and vinyl ester monomer units as main constituent units, and polymers consisting of conjugated diene monomer units as the only constituent units or comprising the conjugated diene monomer units and monomer units copolymerizable therewith as main constituent units.

Examples of the vinyl ester monomer include vinyl acetate, vinylpropionate, vinyl butyrate, vinyl pivalate, vinyl laurate, and vinyl Versatate.

Examples of the conjugated diene monomer include butadiene, isoprene, chloroprene, and isobutylene.

Acrylic polymers are preferred as the dispersed resin in the present invention in that when emulsions of acrylic polymers are applied to a substrate and dried, a pressure-sensitive adhesive layer having excellent transparency can be formed. Preferred among various acrylic polymers are polymers having the following constitution because these polymers are superior especially in pressure-sensitive adhesive properties such as adhesive force, tack, and bonding strength and in blushing resistance.

The preferred polymers are acrylic polymers comprising an alkyl (meth)acrylate monomer unit (a) having 4 to 12 carbon atoms in the alkyl moiety, an $\alpha,\beta$-ethylenically unsaturated carboxylic acid monomer unit (b), and a radically polymerizable monomer unit (c) having a cyclic structure, other than the monomers (a) and (b), wherein the proportions of the monomer unit (a), the monomer unit (b), and the monomer unit (c) are 45 to 97% by weight, 0.1 to 10% by weight, and 2.9 to 30% by weight, respectively, with the total amount of those units being 100% by weight.

Examples of the alkyl (meth)acrylate having 4 to 12 carbon atoms in the alkyl moiety include n-butyl (meth)acrylate, isobutyl (meth)acrylate, n-hexyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, and n-lauryl (meth)acrylate. These monomers may be used alone or in combination of two or more thereof. Of those, the alkyl (meth)acrylates having 4 to 9 carbon atoms in the alkyl moiety are preferable in that those have satisfactory polymerizability and give a pressure-sensitive adhesive having a high adhesive force.

Examples of the $\alpha,\beta$-ethylenically unsaturated carboxylic acid monomer include acrylic acid, methacrylic acid, crotonic acid, maleic acid, fumaric acid, itaconic acid, citraconic acid, cinnamic acid, and maleic anhydride. Those monomers may be used alone or in combination of two or more thereof. Of those, acrylic acid and methacrylic acid are preferable in that those give a pressure-sensitive adhesive having excellent performances.

Examples of the other radically polymerizable monomer having a cyclic structure include monomers having one or more aromatic rings, such as styrene, vinyltoluene, divinyltoluene, $\alpha$-methylstyrene, p-methylstyrene, chlorostyrene, vinyldibenzyl chloride, and benzyl (meth)acrylate, and alicyclic monomers such as cyclohexyl (meth)acrylate and isobornyl (meth)acrylate. Of those, styrene and cyclohexyl (meth)acrylate are preferable.

The preferred ranges of the proportions of the monomer unit (a), monomer unit (b), and monomer unit (c) are as follows.

Monomer unit (a): 55–95 wt %
Monomer unit (b): 0.2–8 wt %
Monomer unit (c): 4.8–25 wt %

The more preferred ranges thereof are as follows.

Monomer unit (a): 65–92 wt %
Monomer unit (b): 0.5–5 wt %
Monomer unit (c): 7.5–20 wt %

If the proportion of the alkyl (meth)acrylate monomer unit (a) having 4 to 12 carbon atoms in the alkyl moiety is lower than 45% by weight, the pressure-sensitive adhesive obtained tends to have a poor balance among bonding strength, cohesive force, and tack. On the other hand, if the proportion thereof exceeds 97% by weight, the pressure-sensitive adhesive tends to have an insufficient cohesive force.

If the proportion of the $\alpha,\beta$-ethylenically unsaturated carboxylic acid monomer unit (b) is lower than 0.1% by weight, there are cases where the pressure-sensitive adhesive obtained is insufficient in cohesive force, bonding strength, and blushing resistance. On the other hand, if the proportion thereof exceeds 10% by weight, the pressure-sensitive adhesive tends to be insufficient in tack, bonding strength, and blushing resistance.

If the proportion of the monomer unit having a cyclic structure is lower than 2.9% by weight, the pressure-sensitive adhesive obtained tends to have insufficient blushing resistance. On the other hand, if the proportion thereof exceeds 30% by weight, there are cases where the pressure-sensitive adhesive is insufficient in tack and bonding strength.

A polymer further comprising, in addition to the monomer units (a), (b), and (c) described above, one or more other monomer units in an amount of up to about 25% by weight based on the weight of the sum of all constituent monomer units can also be preferably used as the acrylic polymer of the present invention.

Examples of the other monomer unit other than the monomers (a), (b), and (c) include alkyl (meth)acrylates 1 to 3 carbon atoms in the alkyl moiety, such as methyl (meth)acrylate, ethyl (meth)acrylate, n-propyl (meth)acrylate, and isopropyl (meth)acrylate; cyano-containing vinyl monomers such as (meth)acrylonitrile and $\alpha$-chloroacrylonitrile; hydroxyl-containing vinyl monomers such as 2-hydroxyethyl (meth)acrylate, 2-hydroxypropyl (meth)acrylate, 2-hydroxy-3-phenoxypropyl (meth)acrylate, glycerol mono(meth)acrylate, polyethylene glycol mono(meth)acrylate, polypropylene glycol mono(meth)acrylate, and mono(meth)acrylates of polyethylene glycol/polypropylene glycol copolymers; monoalkyl esters of unsaturated dicarboxylic acids, such as monoethyl itaconate, monobutyl fumarate, and monobutyl maleate; unsaturated carboxamides and N-substituted derivatives thereof, such as acrylamide, methacrylamide, N-methylolacrylamide, N-methoxymethylacrylamide, and N-methoxybutylacrylamide; unsaturated alcohols such as allyl alcohol; vinyl acetate; glycidyl (meth)acrylate; vinyl chloride; and vinylidene chloride.

Use of monomers such as 2-hydroxyethyl (meth)acrylate, glycidyl (meth)acrylate, (meth)acrylamide, and N-methylolacrylamide (hereinafter sometimes referred to as "crosslinking monomers") is advantageous in that a dispersed resin having a crosslinked structure can be obtained with such a monomer.

In the present invention, the pressure-sensitive adhesive layer obtained by applying an emulsion to a substrate sheet and drying the resulting coating is preferably that the content of resin components insoluble in toluene is 40% by weight or higher based on the weight of the whole resin. This property can be regulated by, for example, appropriately selecting the amount of the crosslinking monomer used. The more preferred range of the proportion of toluene-insoluble resin components is from 50 to 80% by weight. When the proportion of toluene-insoluble resin components in the pressure-sensitive adhesive layer is within the above range, the adhesive layer is excellent in both blushing resistance and pressure-sensitive adhesive properties. The proportion of toluene-insoluble components in a dried pressure-sensitive adhesive layer is hereinafter referred to as a "gel content". In the present invention, the gel content is determined by the method described in the Examples which will be described hereinafter.

(3) Nonionic Surfactant

The aqueous resin emulsion used in the present invention preferably contains a nonionic surfactant in an amount of 0.05 to 5 parts by weight per 100 parts by weight of the dispersed resin. Aqueous resin emulsions containing at least 0.05 parts by weight of a nonionic surfactant have satisfactory stability and excellent blushing resistance. On the other hand, aqueous resin emulsions containing more than 5 parts by weight of a nonionic surfactant have poor blushing resistance. In the present invention, the emulsion obtained has improved blushing resistance so long as it merely contains a nonionic surfactant. Namely, the effect of improving blushing resistance is produced even when the surfactant has been added for another purpose, e.g., stabilization or thickening of the emulsion, prevention of electrification, improvement of leveling, antifoaming, etc.

The content of a nonionic surfactant is more preferably 0.3 to 5 parts by weight, and most preferably from 0.5 to 5 parts by weight, per 100 parts by weight of the dispersed resin.

Typical examples of methods for adding a nonionic surfactant to an emulsion include: a method in which part or all of the emulsifying agent to be used is added to the polymerization system in polymerizing monomers by emulsion polymerization for obtaining an emulsion; and a method in which another kind of surfactant, e.g., an anionic surfactant, is used as an emulsifying agent to conduct emulsion polymerization and a nonionic surfactant is added to the resulting emulsion after the polymerization.

Examples of the nonionic surfactant include polyoxyethylene alkyl ethers, polyoxyethylene alkylphenol ethers, sorbitan/higher fatty acid esters, polyoxyethylene/sorbitan/higher fatty acid esters, polyoxyethylene/higher fatty acid esters, and glycerol/higher fatty acid esters.

(4) Production of Aqueous Resin Emulsion

The aqueous resin emulsion used in the present invention can be produced by polymerizing the above-described monomers in an aqueous medium by, for example, either of the following emulsion polymerization methods.

Specifically, (1) an en bloc feeding method in which all the monomers are introduced into a reactor at a time to conduct emulsion polymerization in an aqueous medium, or (2) an emulsion addition method which comprises emulsifying the monomers beforehand in an aqueous medium, introducing part of the resulting monomer emulsion into a reactor to initiate polymerization in the aqueous medium, and continuously adding the remaining monomer emulsion to further conduct polymerization.

Preferred examples of emulsifying agents used in the emulsion polymerization include the nonionic surfactants enumerated above and anionic surfactants. A combination of two or more thereof may be used. From the standpoint of forming a stable emulsion, the emulsifying agent used in the present invention preferably comprises one or more anionic surfactants alone or a combination of one or more anionic surfactants with one or more nonionic surfactants. The amount of the emulsifying agent used is preferably 0.05 to 5 parts by weight per 100 parts by weight of the monomers used.

Examples of the anionic surfactants include sodium lauryl sulfate, sodium salts of higher alcohol/sulfuric acid esters, ammonium lauryl sulfate, sodium dodecylbenzenesulfonate, sodium dialkylsuccinates, sodium (alkyldiphenyl ether) disulfonates, sodium polyoxyethylene alkyl ether sulfates, and sodium polyoxyethylene alkylphenyl ether sulfates.

In carrying out the above polymerization methods, a lipophilic chain transfer agent such as dodecyl mercaptan, or a hydrophilic chain transfer agent such as mercaptopropionic acid may be used, if desired and necessary.

General additives may be added to the water-based resin emulsion obtained by the above method. Examples thereof include dispersants, antifoaming agents, thickeners, lubricants, film-forming aids, textile auxiliaries, cleaning agents, antistatic agents, level dyeing agents, wetting agents, and leveling agents.

In the present invention, additives such as those shown above are incorporated into the water-based resin emulsion to thereby obtain a water-based pressure-sensitive adhesive. This pressure-sensitive adhesive has a solid concentration of preferably from 30 to 70% by weight, more preferably from 45 to 65% by weight, and a viscosity of preferably from 50 to 20,000 cP as measured with a Brookfield viscometer under the conditions of 25° C. and 12 rpm. The pH thereof is preferably from 2 to 9.

(5) With Respect to Substrate Sheet and Pressure-Sensitive Adhesive Sheet

The substrate sheet for use in the present invention is preferably a transparent sheet from the standpoint that it is effective in taking advantage of the excellent blushing resistance of the pressure-sensitive adhesive layer in the present invention. Examples of the material constituting the transparent substrate sheet include cellophane, polypropylene, polyethylene, polyesters, fluororesins, polystyrene, polyimides, polyacetates, poly(vinyl chloride), glass, acrylic resins, methacrylic resins, polycarbonates, poly(ethylene terephthalate), poly(ethylene naphthalate), liquid-crystal polymers, polyethersulfones, ethylene/vinyl alcohol resins, and urea-melamine resins.

For forming a pressure-sensitive adhesive layer on the substrate sheet to produce a pressure-sensitive adhesive sheet, conventionally known methods may be used.

For example, the water-based resin emulsion is applied to the substrate sheet with a coating machine such as a gravure coater, comma coater, three- or four-roll coater, mayer bar coater, lip coater, die coater, or bar coater or with a doctor blade, bar coater, brush, spray gun, or the like, and the coating is dried at a temperature of from room temperature to 140° C. for from several seconds to about 1 hour, whereby a pressure-sensitive adhesive sheet is obtained. The practical range of the thickness of the pressure-sensitive adhesive layer is from 1 to 100 $\mu$m.

Examples of forms in which the pressure-sensitive adhesive sheet described above is used include a pressure-sensitive adhesive label, pressure-sensitive adhesive tape, and special pressure-sensitive adhesive film. Examples of each of these forms used as transparent pressure-sensitive adhesive sheets are as follows.

Examples of the pressure-sensitive adhesive label include stickers or posters for windows, vehicles, shopwindows, etc., labels for toiletry goods, and labels to be applied to products which may suffer dew condensation. Examples of the pressure-sensitive adhesive tape include masking tapes and sealing tapes. Examples of the special pressure-sensitive adhesive tape include transparent films for outdoors use and window films to be applied to automotive or other windows after having been wetted by water or soapy water.

According to the present invention, a pressure-sensitive adhesive sheet having excellent blushing resistance can be easily obtained. In the case where the substrate sheet used is transparent and/or the pressure-sensitive adhesive sheet is applied to a transparent object, the sheet produces a remarkable effect that the beautiful appearance of the object or sheet is less apt to be impaired because blushing is inhibited.

(6) Examples and Comparative Examples

The present invention will be explained below in more detail by reference to Examples and Comparative Examples, but the invention should not be construed as being limited thereto. Hereinafter, all parts and percents are by weight. The methods used for producing pressure-sensitive adhesive sheets to be tested and for determining gel content, adhesive force, holding power, tack, blushing resistance (visual examination and haze) are as follows.

1) Gel Content

A pressure-sensitive adhesive was applied to a release paper in an amount such that a dry pressure-sensitive adhesive film had a thickness of about 100 $\mu$m. Subsequently, the resulting coating was dried with a circulating hot-air drying oven at 100° C. for 1 hour to form a pressure-sensitive adhesive film.

In 100 ml of toluene was immersed 0.5 g of the pressure-sensitive adhesive film obtained above. This adhesive-containing toluene was allowed to stand for 1 week, and the toluene solution was then filtered through a filter paper. Solid matter thus isolated was dried at 100° C. for 3 hours to obtain insoluble resin components. The amount of the insoluble resin components was measured as gel amount, and the gel content was calculated therefrom using the following equation.

Gel content (wt %)=[Amount of insoluble resin components (g)/ 0.5 ]×100

2) Production of Pressure-Sensitive Adhesive Sheet for Testing

A pressure-sensitive adhesive was applied to a surface of a poly(ethylene terephthalate) film having a thickness of 25 $\mu$m in an amount such that a dry pressure-sensitive adhesive film had a thickness of 20 $\mu$m. Subsequently, the coating was dried with a circulating hot-air drying oven at 100° C. for 120 seconds to produce a pressure-sensitive adhesive sheet.

3) Adhesive Force

Using the pressure-sensitive adhesive sheet obtained above and a stainless-steel plate as an adherend, the 180 degree peel strength was measured in accordance with JIS Z-0237 under the conditions of 23° C. and 65% RH.

4) Holding Power

The pressure-sensitive adhesive sheet obtained above was adhered to a stainless-steel plate such that the adhered area was 25 mm×25 mm. A load of 1 kg was applied to the adhered sheet and the time required for the sheet to slip off the plate at 40° C. was measured. This holding time was taken as the holding power. In the case of a sample which remained adherent to the stainless-steel plate at 180 minutes after the test initiation, the holding time thereof was regarded as 180 minutes or more and the width of slippage from the initial position was measured and is given together with the value of holding time.

5) Tack

Measurement was made by the rolling ball method in accordance with JIS Z-0237 under an atmosphere of 23° C. and 65% RH.

6) Blushing Resistance (Visual Examination)

The pressure-sensitive adhesive sheet was immersed in 20° C. water for 3 days. Thereafter, the degree of blushing of the coating film was visually evaluated. The evaluation results are shown in the following five grades.

⊚: The coated part is transparent, and the boundary between the coated and uncoated parts is unclear.

○: The coated part is almost transparent, but the boundary between the coated and uncoated parts is dimly seen.

□: The coated part is slightly milky.

Δ: The coated part is milky.

×: The coated part is considerably milky.

7) Blushing Resistance (Haze)

The pressure-sensitive adhesive sheet which had been immersed in water for 3 days was examined for haze with a hazeometer. The larger the value of haze, the higher the degree of blushing.

In the Examples and Comparative Examples, the following abbreviations were used for monomers and chain transfer agents.

HA: 2-ethylhexyl acrylate
BA: butyl acrylate
St: styrene
CHA: cyclohexyl acrylate
CHMA: cyclohexyl methacrylate
MA: methyl acrylate
MMA: methyl methacrylate
EA: ethyl acrylate
AN: acrylonitrile
VAc: vinyl acetate
GMA: glycidyl methacrylate
HEA: 2-hydroxyethyl acrylate
HEMA: 2-hydroxyethyl methacrylate
N-MAM: N-methylolacrylamide
AMD: acrylamide
AA: acrylic acid
MAA: methacrylic acid
DM: dodecyl mercaptan
MPA: mercaptopropionic acid

EXAMPLE 1

Fifty (50) parts of water was introduced into a reaction vessel equipped with a stirrer, a thermometer, a condenser, a nitrogen-introducing tube, and two dropping funnels. The contents were heated to 80° C.

Three (3) parts of sodium polyoxyethylene nonylphenyl ether sulfate and 27 parts of water were added to a monomer mixture having the composition shown in Table 1 to emulsify the monomer mixture. The resulting emulsion and 8 parts by weight of a 5% aqueous solution of ammonium persulfate as a polymerization initiator were continuously dropped into the flask respectively from the two dropping funnels over 4 hours to conduct emulsion polymerization. At 2 hours after termination of the dropwise addition, the system was cooled to terminate the polymerization. Ammonia water was added to the thus-obtained copolymer emulsion to prepare a pressure-sensitive adhesive having the liquid properties shown in Table 6.

EXAMPLE 2

Into the same type of a reaction vessel as used in Example 1 were introduced 50 parts of water and 0.1 part of sodium lauryl sulfate. The contents were heated to 80° C.

One (1) part of sodium lauryl sulfate and 27 parts of water were added to a monomer mixture having the composition shown in Table 1 to emulsify the monomer mixture. Polymerization and adjustment were conducted in the same manner as in Example 1 to obtain a pressure-sensitive adhesive.

EXAMPLES 3 TO 10

Polymerization and adjustment were conducted in the same manner as in Example 1, except that monomer mixtures respectively having the compositions shown in Table 1 were used, and that the kind and amount of the emulsifying agent introduced into the reaction vessel and the kind and amount of the emulsifying agent used for monomer mixture emulsification were changed as shown in Table 2. Thus, pressure-sensitive adhesives were obtained.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Monomer and chain transfer agent (parts) | HA | | 83.0 | 40.0 | 67.5 | 40.5 | 72.0 | 30.0 | | 80.5 | 60.0 |
| | BA | 80.0 | | 38.0 | | 40.0 | | 49.5 | 79.5 | | 20.0 |
| | St | | | 7.0 | 10.0 | 15.0 | 24.0 | | | 15.0 | |
| | CHA | | | | | | | 10.0 | | | |
| | CHMA | | | | | | | | 10.0 | | 15.0 |
| | MA | | | | | | 2.0 | | | | |
| | MMA | 10.0 | | 5.0 | | | | | 5.0 | | |
| | EA | | 5.0 | | 10.0 | | 1.0 | | | | |
| | AN | 5.0 | | 5.0 | 5.0 | | | 5.0 | | | |
| | VAc | | 5.0 | | | | | | | | |
| | GMA | 2.0 | | | | | 1.5 | | | 2.2 | |
| | HEA | | 4.0 | | 1.5 | | | 2.0 | | | |
| | HEMA | | | 2.0 | | | | | 2.5 | | 4.0 |
| | N-MAM | | 1.0 | 0.5 | 0.5 | | | 0.5 | | | |
| | AMD | | | | | 0.5 | 1.0 | | | | |
| | AA | | | | | 2.0 | 0.4 | | | | |
| | MAA | 3.0 | 2.0 | 2.5 | 5.5 | | | 3.0 | 3.0 | 2.0 | 1.0 |
| | DM | | | | 0.1 | | | | | | |
| | MPA | | | | | | 0.1 | | | 0.3 | |

TABLE 2

| | | | Example | | | | |
|---|---|---|---|---|---|---|---|
| | | | 1 | 2 | 3 | 4 | 5 |
| Emulsifier used in polymerization (parts) | Ionic surfactant | Sodium dodecylbenzene-sulfonate | | | 0.05 + 0.5 | 0.05 + 0.5 | 0.05 + 0.5 |
| | | Sodium lauryl sulfate | | 0.1 + 1.0 | | | |
| | | Sodium polyoxyethylene nonylphenyl ether sulfate | 0 + 3.0 | | | | |
| | | Sodium dialkylsulfo-succinate | | | | | |
| | Nonionic surfactant | Polyoxyethylene nonylphenyl ether | | | | | |

TABLE 2-continued

|  |  |  | Example | | | | |
|---|---|---|---|---|---|---|---|
|  |  |  | 6 | 7 | 8 | 9 | 10 |
| Emulsifier used in polylmerization (parts) | Ionic surfactant | Sodium dodecylbenzenesulfonate | 0.05 + 0.5 | 0.05 + 0.5 | 0.05 + 0.5 |  | 0.05 + 0.5 |
|  |  | Sodium lauryl sulfate |  |  |  |  |  |
|  |  | Sodium polyoxyethylene nonylphenyl ether sulfate |  |  |  |  |  |
|  |  | Sodium dialkylsulfosuccinate |  |  |  | 0.1 + 0.5 |  |
|  | Nonionic surfactant | Polyoxyethylene nonylphenyl ether |  |  |  |  | 0 + 1.0 |

(Note) The numeral preceding each "+" indicates the amount (parts by weight) of the emulsifier present in the reactor at the time of reaction initiation, while the numeral following each "+" indicates the amount (parts by weight) of the emulsifier contained in the monomer emulsion to be dropped.

EXAMPLES 11 TO 14

Each of the nonionic sufactants shown in Table 3 was added in the amount shown in Table 3 to the copolymer emulsion obtained in Example 4. Thus, pressure-sensitive adhesives were prepared.

TABLE 3

|  |  | Example | | | |
|---|---|---|---|---|---|
|  |  | 11 | 12 | 13 | 14 |
| Nonionic surfactant added to emulsion after polymerization (parts) | Polyoxyethylene octylphenyl ether (HLB: 13.1) |  |  | 1.0 |  |
|  | Polyoxyethylene nonylphenyl ether (HLB: 15.1) |  |  |  | 3.0 |
|  | Polyoxyethylene oleyl ether (HLB: 16.2) | 0.2 |  |  |  |
|  | Polyoxyethylene sorbitan monolaurate (HLB: 16.7) |  | 0.4 |  |  |

EXAMPLES 15 TO 20

Copolymer emulsions were obtained in the same manner as in Example 1, except that monomer mixtures respectively having the compositions shown in Table 4 were used, and that the kind and amount of the emulsifying agent introduced into the reaction vessel and the kind and amount of the emulsifying agent used for monomer mixture emulsification were changed as shown in Table 4. With respect to some of these copolymer emulsions, the nonionic surfactants shown in Table 4 were added thereto in the amounts shown in Table 4. Thus, pressure-sensitive adhesives were prepared. Rheolate 255 and Adekanol UH-420 each is a thickening agent comprising a nonionic polymer derivative, and are trade names of Rhox Corp. and Asahi Denka Kogyo K.K., respectively.

TABLE 4

|  |  | Example | | | | | |
|---|---|---|---|---|---|---|---|
|  |  | 15 | 16 | 17 | 18 | 19 | 20 |
| Monomer and chain transfer agent (parts) | HA | 80.0 | 80.0 | 74.5 |  | 63.0 | 80.0 |
|  | BA |  |  |  | 80.0 |  |  |
|  | St | 15.0 | 15.0 | 10.0 |  | 35.0 | 15.0 |
|  | CHA |  |  |  | 10.0 |  |  |
|  | MMA |  |  |  | 8.0 |  |  |
|  | GMA |  |  |  |  | 0.5 |  |
|  | HEA |  |  | 15.0 |  |  |  |
|  | HEMA | 15 | 1.5 |  |  |  | 1.5 |
|  | N-MAM | 0.4 | 0.4 | 0.3 |  |  | 0.5 |

TABLE 4-continued

|  |  |  | Example | | | | | |
|---|---|---|---|---|---|---|---|---|
|  |  |  | 15 | 16 | 17 | 18 | 19 | 20 |
|  |  | AA |  |  |  | 2.0 |  |  |
|  |  | MAA | 3.0 | 3.0 | 0.3 |  | 1.5 | 3.0 |
|  |  | DM | 0.1 | 0.1 |  |  |  | 0.1 |
|  |  | MPA |  |  |  | 0.1 | 0.3 |  |
| Emulsifier used in polymerization (parts) | Ionic surfactant | Sodium dodecylbenzenesulfonate | 0.05 + 0.5 | 0.05 + 0.5 |  |  | 0.05 + 2.0 | 0.05 + 0.5 |
|  |  | Sodium polyoxyethylene nonylphenyl ether sulfate |  |  | 0.1 + 1.0 |  |  |  |
|  |  | Sodium dialkylsulfosuccinate |  |  |  | 0.1 + 3.0 |  |  |
| Nonionic surfactant added to emulsion after polymerization (parts) | Polyoxyethylene nonylphenyl ether (HLB: 15.1) | 1.0 |  |  |  |  |  |
|  | Polyoxyethylene oleyl ether (HLB: 16.2) |  | 2.0 |  |  |  | 5.0 |  |
|  | Rheolate 255 | 3.2 | 2.0 |  |  |  |  |
|  | Adekanol UH-420 |  | 2.7 |  |  |  |  |

(Note) In the row "Emulsifier used in polymerization", the numeral preceding each "+" indicates the amount (parts by weight) of the emulsifier present in the reactor at the time of reaction initiation, while the numeral following each "+" indicates the amount (parts by weight) of the emulsifier contained in the monomer emulsion to be dropped.

COMPARATIVE EXAMPLES 1 AND 2

Copolymer emulsions were obtained in the same manner as in Example 1, except that the composition of the monomer mixture, the kind and amount of the emulsifying agent introduced into the reaction vessel, and the kind and amount of the emulsifying agent used for monomer mixture emulsification were changed as shown in Table 5. Thereafter, the nonionic surfactant shown in Table 5 was added to the copolymer emulsions in the amount shown in Table 5. Thus, pressure-sensitive adhesives were prepared.

TABLE 5

|  |  |  | Comparative Example | | |
|---|---|---|---|---|---|
|  |  |  | 1 | 2 | 3 |
| Monomer and chain transfer agent (parts) | | HA | 80.0 | 80.0 | 80.0 |
|  |  | St | 15.0 | 15.0 | 15.0 |
|  |  | HEMA | 1.5 | 1.5 | 1.5 |
|  |  | N-MAM | 0.5 | 0.5 | 0.5 |
|  |  | MAA | 3.0 | 3.0 | 3.0 |
|  |  | DM | 0.1 | 0.1 | 0.1 |
| Emulsifier used in polymerization (parts) | Ionic surfactant | Sodium dodecylbenzenesulfonate |  |  | 0.05 + 0.8 |
|  |  | Sodium polyoxyethylene nonylphenyl ether sulfate | 0 + 0.5 |  |  |
|  |  | Sodium dialkylsulfosuccinate |  | 0 + 0.05 |  |
| Nonionic surfactant added to emulsion after polymerization (parts) | Polyoxyethylene sorbitan monolaurate (HLB: 16.7) | 2.5 | 2.5 | 2.5 |

(Note) In the row "Emulsifier used in polymerization", the numeral preceding each "+" indicates the amount (parts by weight) of the emulsifier present in the reactor at the time of reaction initiation, while the numeral following each "+" indicates the amount (parts by weight) of the emulsifier contained in the monomer emulsion to be dropped.

COMPARATIVE EXAMPLE 3

Into the same type of the reaction vessel as used in Example 1 were introduced 50 parts of water and 0.05 parts of sodium dodecylbenzenesulfonate. The contents were heated to 80° C. To a monomer mixture having the composition shown in Table 5 were added 0.5 parts of sodium dodecylbenzenesulfonate and 27 parts of water to emulsify the monomer mixture. The resulting emulsion and the same polymerization initiator as used in Example 1 were continuously dropped into the flask over 4 hours to conduct emulsion polymerization. After initiation of the dropwise addition, 0.1 part of sodium dodecylbenzenesulfonate was introduced into the flask every 1 hour, i.e., 3 times in total. The emulsion obtained was treated in the same manner as in Example 1 to prepare a pressure-sensitive adhesive.

The pressure-sensitive adhesives obtained in Examples 1 to 20 and Comparative Examples 1 to 3 were analyzed for the weight average particle diameter and particle diameter distribution of the dispersed particles, and for gel content after drying, etc. These adhesives were further evaluated for pressure-sensitive adhesive performances. The results obtained are shown in Tables 6 to 8.

TABLE 6

| | | Example | | | | | | | | | |
|---|---|---|---|---|---|---|---|---|---|---|---|
| | | 1 | 2 | 3 | 4 | 5 | 6 | 7 | 8 | 9 | 10 |
| Property | NV (%) | 55.1 | 54.9 | 50.0 | 50.2 | 50.1 | 54.9 | 50.3 | 50.3 | 50.1 | 50.0 |
| | BV (cP) | 1000 | 450 | 520 | 4300 | 390 | 170 | 890 | 850 | 340 | 200 |
| | pH | 7.0 | 7.0 | 7.0 | 6.0 | 7.0 | 9.0 | 7.0 | 7.0 | 7.0 | 8.0 |
| | Weight average particle diameter (μm) | 0.11 | 0.25 | 0.20 | 0.19 | 0.19 | 0.17 | 0.25 | 0.27 | 0.29 | 0.25 |
| | Particle diameter distribution | 1.08 | 1.19 | 1.14 | 1.13 | 1.13 | 1.12 | 1.20 | 1.20 | 1.32 | 1.16 |
| | Gel content (%) | 52 | 80 | 60 | 55 | 46 | 55 | 60 | 56 | 53 | 70 |
| | Adhesive force (gf/25 mm) | 1200 | 850 | 980 | 900 | 1050 | 850 | 950 | 1000 | 1020 | 950 |
| | Holding power | | | | | | | | | | |
| | Holding time (min) | 150 | >180 | >180 | >180 | >180 | >180 | >180 | >180 | >180 | >180 |
| | Slippage width (mm) | | 0 | 0 | 0.1 | 0.2 | 0.1 | 0 | 0 | 0.3 | 0 |
| | Tack | 10 | 6 | 7 | 7 | 8 | 5 | 6 | 6 | 7 | 8 |
| | Blushing resistance (visual examination) | □ | □ | □ | ○ | ○ | ○ | ○ | □ | □ | ⊚ |
| | Blushing resistance (haze) | 47.0 | 50.2 | 39.8 | 26.2 | 23.4 | 30.0 | 32.1 | 36.5 | 42.0 | 15.6 |

TABLE 7

| | | Example | | | | | | | | | |
|---|---|---|---|---|---|---|---|---|---|---|---|
| | | 11 | 12 | 13 | 14 | 15 | 16 | 17 | 18 | 19 | 20 |
| Property | NV (%) | 50.2 | 50.2 | 50.2 | 50.2 | 50.1 | 50.1 | 50.0 | 50.3 | 50.2 | 50.1 |
| | BV (cP) | 4300 | 4300 | 4300 | 4300 | $10^4$ | 8500 | 1100 | 170 | 210 | 7000 |
| | pH | 6.0 | 6.0 | 6.0 | 6.0 | 6.5 | 6.5 | 7.0 | 7.0 | 7.0 | 7.0 |
| | Weight average particle diameter (μm) | 0.19 | 0.19 | 0.19 | 0.19 | 0.23 | 0.23 | 0.25 | 0.20 | 0.18 | 0.19 |
| | Particle diameter distribution | 1.13 | 1.13 | 1.13 | 1.13 | 1.18 | 1.18 | 1.20 | 1.15 | 1.12 | 1.13 |
| | Gel content (%) | 55 | 55 | 55 | 55 | 54 | 54 | 68 | 35 | 62 | 52 |
| | Adhesive force (gf/25 mm) | 900 | 910 | 910 | 930 | 1030 | 1030 | 850 | 2500 | 400 | 980 |
| | Holding power | | | | | | | | | | |
| | Holding time (min) | >180 | >180 | >180 | >180 | >180 | >180 | 100 | >180 | >180 | >180 |
| | Slippage width (mm) | 0.1 | 0.1 | 0.1 | 0.1 | 0 | 0 | 0 | | 0 | 0.5 |
| | Tack | 7 | 7 | 7 | 7 | 8 | 8 | 6 | 15 | 3 | 9 |
| | Blushing resistance (visual examination) | ○ | ○ | ⊚ | ⊚ | ⊚ | ⊚ | □ | □ | ⊚ | □ |
| | Blushing resistance (haze) | 25.7 | 20.3 | 15.2 | 14.8 | 13.9 | 16.0 | 40.3 | 51.3 | 15.5 | 48.8 |

TABLE 8

|  |  | Comparative Example | | |
|---|---|---|---|---|
|  |  | 1 | 2 | 3 |
| Property | NV (%) | 50.3 | 50.3 | 50.2 |
|  | BV (cP) | 580 | 450 | 180 |
|  | pH | 7.0 | 7.0 | 7.0 |
|  | Weight average particle diameter ($\mu$m) | 0.50 | 1.00 | 0.25 |
|  | Particle diameter distribution | 1.35 | 1.60 | 1.59 |
|  | Gel content (%) | 55 | 55 | 53 |
|  | Adhesive force (gf/25 mm) | 930 | 930 | 960 |
|  | Holding power |  |  |  |
|  | Holding time (min) | >180 | >180 | >180 |
|  | Slippage width (mm) | 0 | 0 | 0.1 |
|  | Tack | 8 | 8 | 8 |
|  | Blushing resistance (visual examination) | x | x | x |
|  | Blushing resistance (haze) | 85.0 | 92.3 | 80.7 |

In Tables 6 to 8:

NV: Content of non-volatile component

BV: Brookfield viscosity. Brookfield type viscometer was used, a rotary bob was rotated at 12 rpm, and a viscosity (temperature :25° C.) after 90 seconds was measured.

As is apparent from Tables 6 to 8, the pressure-sensitive adhesives obtained in Examples 1 to 20, which had a weight average particle diameter of 0.3 $\mu$m or smaller and a particle diameter distribution of 1.0 to 1.5, each had excellent blushing resistance and satisfactory pressure-sensitive adhesive performances.

The pressure-sensitive adhesives obtained in Examples 3 to 9, which each was satisfied with two of the three requirements concerning gel content, the composition of dispersed particles in an emulsion, and the content of a nonionic surfactant, had better blushing resistance than the pressure-sensitive adhesives obtained in Examples 1, 2, 17, 18, etc., which each was satisfied with only one of the three requirements. The pressure-sensitive adhesives obtained in Examples 10 to 16, which each was satisfied with all the three requirements, had even better blushing resistance.

While the invention has been described in detail and with reference to specific embodiments thereof, it will be apparent to one skilled in the art that various changes and modifications can be made therein without departing from the spirit and scope thereof.

What is claimed is:

1. In a process for producing a pressure-sensitive adhesive sheet comprising applying an aqueous resin emulsion to a substrate sheet and drying the resulting coating to form a pressure-sensitive adhesive layer, the improvement wherein said aqueous resin emulsion is an aqueous resin emulsion that dispersed particles have a weight average particle diameter of 0.3 $\mu$m or smaller and a ratio of the weight average particle diameter thereof to an arithmetic-average particle diameter thereof is 1.0 to 1.5.

2. The process for producing a pressure-sensitive adhesive sheet as claimed in claim 1, wherein the resin contained in the aqueous resin emulsion comprises an alkyl (meth) acrylate monomer unit (a) having 4 to 12 carbon atoms in the alkyl moiety, an $\alpha,\beta$-ethylenically unsaturated carboxylic acid monomer unit (b), and a radically polymerizable monomer unit (c) having a cyclic structure, other than the monomers (a) and (b), and proportions of the monomer unit (a), the monomer unit (b), and the monomer unit (c) are 45 to 97% by weight, 0.1 to 10% by weight, and 2.9 to 30% by weight, respectively, the total amount of those units (a), (b) and (c) being 100% by weight.

3. The process for producing a pressure-sensitive adhesive sheet as claimed in claim 2, wherein the proportions of the monomer unit (a), the monomer unit (b), and the monomer unit (c) are 55 to 95% by weight, 0.2 to 8% by weight, and 4.8 to 25% by weight, respectively.

4. The process for producing a pressure-sensitive adhesive sheet as claimed in claim 2, wherein the proportions of the monomer unit (a), the monomer unit (b), and the monomer unit (c) are 62 to 92% by weight, 0.5 to 5% by weight, and 7.5 to 20% by weight, respectively.

5. The process for producing a pressure-sensitive adhesive sheet as claimed in claim 2, wherein the alkyl (meth) acrylate monomer unit (a) having 4 to 12 carbon atoms in the alkyl moiety is at least one member selected from the group consisting of n-butyl (meth)acrylate, isobutyl (meth) acrylate, n-hexyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, and n-lauryl (meth)acrylate.

6. The process for producing a pressure-sensitive adhesive sheet as claimed in claim 2, wherein the $\alpha,\beta$-ethylenically unsaturated carboxylic acid monomer unit (b) is at least one member selected from the group consisting of acrylic acid, methacrylic acid, crotonic acid, maleic acid, fumaric acid, itaconic acid, citraconic acid, cinnamic acid, and maleic anhydride.

7. The process for producing a pressure-sensitive adhesive sheet as claimed in claim 2, wherein the radically polymerizable monomer unit (c) having a cyclic structure, other than the monomers (a) and (b), is monomers having aromatic rings or alicyclic monomers.

8. The process for producing a pressure-sensitive adhesive sheet as claimed in claim 2, wherein the radically polymerizable monomer unit (c) having a cyclic structure, other than the monomers (a) and (b), is at least one member selected from the group consisting of styrene, vinyltoluene, divinyltoluene, $\alpha$-methylstyrene, p-methylstyrene, chlorostyrene, vinyldibenzyl chloride, benzyl (meth) acrylate, cyclohexyl (meth)acrylate and isobornyl (meth) acrylate.

9. The process for producing a pressure-sensitive adhesive sheet as claimed in claim 1, wherein the dispersed particles have the weight average particle diameter of 0.01 to 0.28 $\mu$m.

10. The process for producing a pressure-sensitive adhesive sheet as claimed in claim 9, wherein the dispersed particles have the weight average particle diameter of 0.05 to 0.26 $\mu$m.

11. The process for producing a pressure-sensitive adhesive sheet as claimed in claim 1, wherein the dispersed particles have the (weight average particle diameter)/ (arithmetic-average particle diameter) ratio of 1.0 to 1.4.

12. The process for producing a pressure-sensitive adhesive sheet as claimed in claim 11, wherein the dispersed particles have the (weight average particle diameter)/ (arithmetic-average particle diameter) ratio of 1.0 to 1.3.

13. The process for producing a pressure-sensitive adhesive sheet as claimed in claim 1, wherein the pressure-sensitive adhesive layer comprises toluene-insoluble resins in an amount of at least 40% by weight based on the weight of the total resin.

14. The process for producing a pressure-sensitive adhesive sheet as claimed in claim 1, wherein the aqueous resin emulsion further contains a nonionic surfactant.

15. The process for producing a pressure-sensitive adhesive sheet as claimed in claim 14, wherein the nonionic surfactant is contained in an amount of 0.05 to 5 parts by weight per 100 parts by weight of the dispersed resin.

16. The process for producing a pressure-sensitive adhesive sheet as claimed in claim 1, wherein the substrate sheet is a transparent sheet.

17. The process for producing a pressure-sensitive adhesive sheet as claimed in claim 16, wherein the transparent substrate sheet comprises a material selected from the group consisting of cellophane, polypropylene, polyethylene, polyesters, fluororesins, polystyrene, polyimides, polyacetates, poly(vinyl chloride), glass, acrylic resins, methacrylic resins, polycarbonates, poly(ethylene terephthalate), poly(ethylene naphthalate), liquid-crystal polymers, polyethersulfones, ethylene/vinyl alcohol resins, and urea-melamine resins.

* * * * *